United States Patent [19]

Martin, Jr.

[11] 4,301,828
[45] Nov. 24, 1981

[54] PROTECTIVE COVER DEVICE

[76] Inventor: Timothy J. Martin, Jr., 1328 Pangborn Rd., Lynden, Wash. 98264

[21] Appl. No.: 104,154

[22] Filed: Dec. 17, 1979

[51] Int. Cl.$^3$ .................. F16K 35/00; B65D 25/00
[52] U.S. Cl. .................................. 137/381; 137/382; 220/85 P
[58] Field of Search .................... 137/315, 381, 382; 220/85 P, 4 B, 4 E; 285/373, 419, 45

[56] References Cited

U.S. PATENT DOCUMENTS

| | | | |
|---|---|---|---|
| 1,084,996 | 1/1914 | Wright | 137/382 |
| 1,652,510 | 12/1927 | Allen | 251/144 |
| 3,480,252 | 11/1969 | Simons | 137/381 |
| 3,871,401 | 3/1975 | Lyons | 137/381 |
| 3,963,144 | 6/1976 | Berwahl | 220/85 P |
| 3,999,825 | 12/1976 | Cannon | 285/373 X |
| 4,137,943 | 2/1979 | Rath | 137/587 |

*Primary Examiner*—A. Michael Chambers
*Attorney, Agent, or Firm*—Hughes, Barnard & Cassidy

[57] ABSTRACT

A protective cover device for use in maintaining the inlet and/or outlet valves mounted in a wall of a liquid storage tank in a contaminant-free state during periods of both use and non-use and wherein the tank valve projects outwardly from a wall on the tank coaxially through a mounting flange mounted thereon in surrounding relation to the projecting valve. More specifically, a protective cover device of the foregoing character comprising a pair of essentially complementary mating cover elements adapted to be hingedly connected together and defining an aperture in at least one pair of mating edges thereof suitable for permitting the coupling of an inlet/outlet liquid conduit—typically a hose—to the tank valve while the protective cover device is in place and wherein first and second imperforate cover means are provided for respectively covering the aperture when the tank valve is closed and when the tank valve is opened, such second cover means including a liquid conduit projecting therethrough and having means for coupling the inwardly projecting portion of the conduit to the tank valve, thereby precluding entry of contaminants to the interior of the protective cover device (i) when the valve is closed and the first cover means is in place, and (ii) when the valve is open and the second cover means is in place. In a preferred embodiment, the protective cover device provides a dust-tight valve enclosure which finds particularly advantageous use in connection with mobile tank trucks of the type commonly employed in the dairy industry and used to transport comestible products such as milk.

20 Claims, 10 Drawing Figures

PROTECTIVE COVER DEVICE

BACKGROUND OF THE INVENTION

The present invention relates in general to protective cover devices suitable for precluding ingress of contaminants to the area of an inlet and/or an outlet valve mounted in the wall of a storage tank during periods of (i) use when the valve is open and coupled to an external liquid inlet and/or outlet conduit, and (ii) non-use when the valve is closed; and, more particulary, to a protective cover device of the foregoing character which provides an effective, reliable, dust-tight enclosure for the storage tank valve, especially in those environments wherein governmentally imposed and/or industry imposed regulations, or simply common prudence, mandate that protective measures be taken to insure that liquids can be safely introduced into and/or removed from a storage tank in a substantially contaminant-free environment—e.g., in an environment such as that encountered when on-loading and off-loading milk to and from a storage tank of a conventional dairy truck.

Currently, Federal regulations require that on-loading, transporting, and off-loading of various products, particularly those in liquid form—e.g., comestible products such as milk—be carried out in a controlled, essentially contaminant-free environment. Such regulations impose severe operating constraints when such liquid products are pumped into, transporated in, or pumped out of the transporting vehicle. Traditionally, milk is transported between the producing sites—viz., the dairy farm where dust and/or other airborne contaminants are commonly encountered—and a remotely located processing facility in a stainless steel tank trailer wherein the tank is provided with at least one milk entry and/or exit valve. In operation, liquid conduit means, commonly a hose having pump means operatively associated therewith, is attached to both the invidual producer's storage tank and to the tank trailer valve at each stop on a daily pick-up route, thereby enabling transfer of the milk in the producer's storage tank to the tank trailer for daily transport to the remotely located milk processing facility.

In order to prevent dust and other airborne materials from contaminating the valve, a dust cover has been conventionally placed about the valve and affixed to the milk tank trailer. Previously, such dust covers have taken the form of fabricated box-like enclosing members made of stainless steel or other metal affixed to the milk tank by suitable fasteners such as rivets or screws. Such box-like dust cover has been provided with one or more openings in the flat sides of the box, each covered by an access door, to permit access to the valve. In use, it is necessary to open the access door in the box-like cover, attach the hose, open the valve, reclose the valve when on-loading and/or off-loading is complete, remove the hose, and reclose the box-like access door. Because the hose to be attached to and removed from the valve is generally relatively rigid, tank truck operators have commonly experienced considerable difficulty in attempting to affix the hose to and/or remove the hose from the valve when the dust cover is in place. Moreover, difficulties have been encountered in obtaining an effective, reliable, dust-tight, and sanitary enclosure during periods when access doors are open to permit attachment of the hose, opening of the valve, conducting of an on-loading or off-loading operation, closure of the valve, and uncoupling of the hose from the valve.

During a normal operating day, a tank truck operator will normally be required to make a relatively large number of stops at individual dairy farms in order to collect the milk stored on a daily basis and transport the same to a suitable remotely located processing center. Usage of conventional box-like dust covers of the foregoing type tends to reduce the speed with which the tank truck operator can collect milk at each stop, thereby decreasing daily productivity. Moreover, such conventional fabricated box-like covers have proven difficult to clean on a routine, daily basis. Consequently, it has been a common practice employed by tank truck operators to simply not use the conventional dust covers, notwithstanding Federal and industry imposed regulations, thereby enabling the operator to significantly speed up the collection process.

SUMMARY OF THE INVENTION

It is a general aim of the present invention to provide a simple, effective, and reliable protective cover device suitable for maintaining the inlet and/or outlet valve means of a liquid storage tank in a contaminant-free state during periods when the valve is both open and closed, yet which overcomes all of the foregoing disadvantages inherent in conventional dust covers and, particularly, which will not impede the tank truck operator in his daily collection activities.

In its principle aspects, it is an object of the present invention to provide an improved protective cover device suitable for usage with tank trucks and the like which is simple, reliable, inexpensive, and permits of ease of operation, thereby permitting the tank truck operator to readily connect a hose to and/or disconnect a hose from the tank valve and to open or close the valve with the cover device in place without any significant loss in operational time. In this connection, it is an object of the invention to provide an improved protective cover device of the foregoing type which, because of its simplicity and ease of operation, will be routinely used by tank truck operators in compliance with regulatory provisions imposed by either or both of governmental and/or private regulatory agencies.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Figures 1, 2:
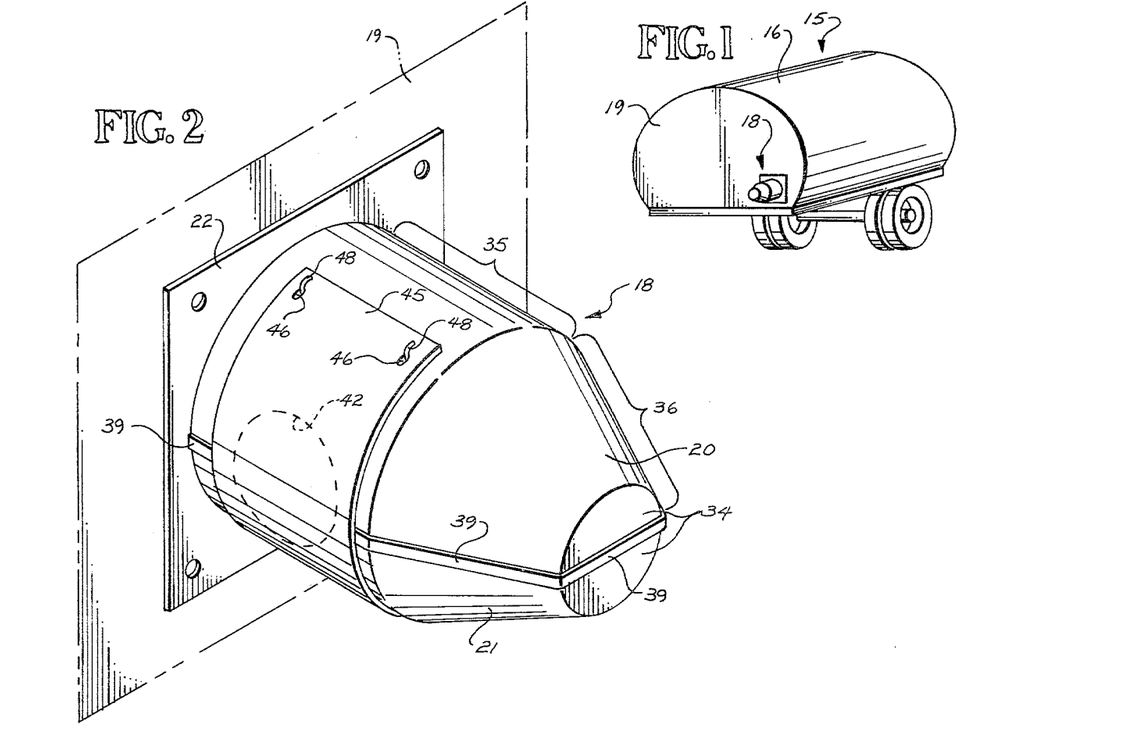
FIG. 1 is a perspective view of a conventional storage tank trailer of the type commonly employed in the dairy industry, here employing a protective cover device embodying features of the present invention for maintaining the inlet/outlet valve member of the tank in a contaminant-free state.
FIG. 2 is a highly enlarged perspective view of a protective cover device embodying features of the present invention, here illustrating the device in the closed position normally employed when the inlet/outlet valve is closed as the tank trailer moves between adjacent pick-up sites.

Briefly, and referring first to FIG. 1, there has been illustrated a conventional tank trailer, generally indicated at 15, of the type commonly employed in transporting liquid products such, merely by way of example, as comestible products—e.g., milk. The tank trailer 15 is commonly hitched to a suitable truck cab (not shown) and includes an enclosed tank 16 formed of any suitable material such as stainless steel and suitable inlet/outlet valve means (not shown in FIG. 1) for permitting liquid products to be both on-loaded to, and off-loaded from, the tank 16.

In accordance with one of the important aspects of the present invention, provision is made for enclosing the inlet/outlet valve means associated with a liquid storage tank 16 within a contaminant-free environment during periods when the valve is open—e.g., during either an on-loading or an off-loading operation—and when the valve is closed—e.g., when the tank trailer is in transit either between adjacent dairy farms or between a dairy farm and the milk processing center—yet, wherein the protective cover device employed is simple, reliable, effective in operation, and permits of ease of use by the tank truck operator without any significant loss of time during on-loading and/or off-loading operations. To this end, a protective cover device, generally indicated at 18 in FIG. 1, is mounted on the rear wall 19 of the tank trailer 15 in surrounding relation to the inlet/outlet valve means (not shown in FIG. 1) formed on the wall 19 of tank 16. As best illustrated by reference to FIGS. 2 and 3 conjointly, the protective cover device 18 of the present invention includes a pair of mating, complementary cover elements 20, 21 which are designed to be removably secured to a mounting plate 22 affixed to the end wall 19 (FIGS. 1 and 2) on tank 16 (FIG. 1) by ay suitable mounting means such, for example, as by welding or with the use of rivets or suitable threaded fasteners.

Figure 3:
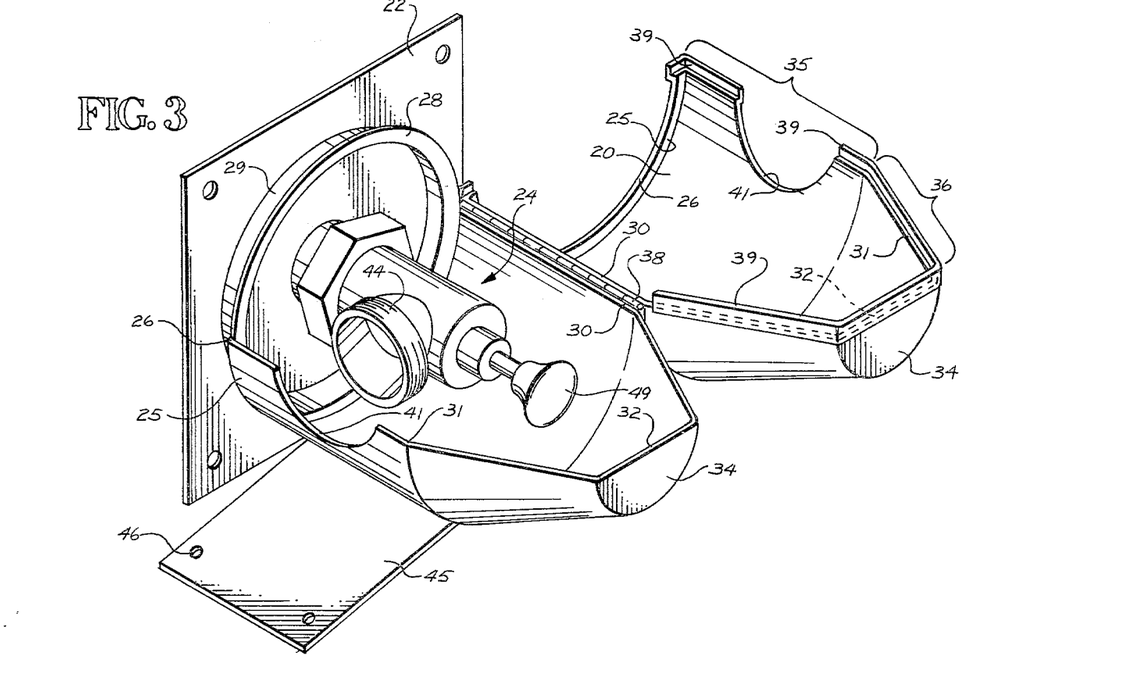
FIG. 3 is a perspective view of the protective cover device shown in FIG. 2, here illustrating the cover device in the open position with the inlet/outlet valve completely exposed and accessible.
Figure 5:
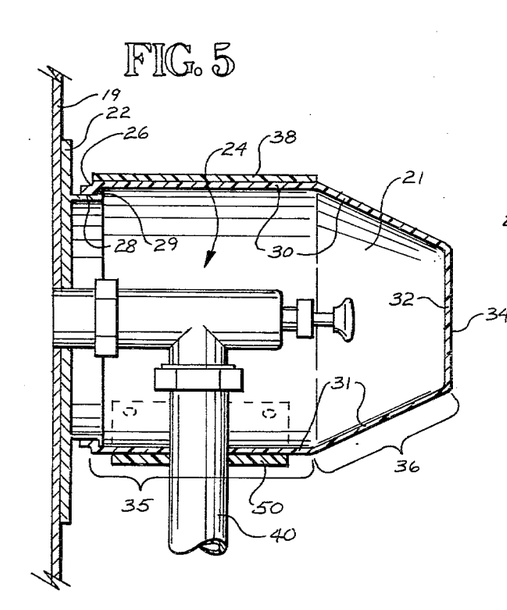
FIG. 5 is a view partially in plan and partially in section taken substantially along the line 5—5 in FIG. 4.

To permit of ease of assembly of the protective cover device 18 to the tank trailer 15 and ease of coupling and/or uncoupling liquid conduits to the inlet/outlet valve, generally indicated at 24 in FIG. 3, the first and second mating complementary cover elements 20, 21 are each provided with a semi-circular base portion 25 defining a radially inwardly extending retaining flange 26 adapted to fit snugly about a generally circular, radially outwardly extending retaining lip 28 integral with the mounting flange 29 on mounting plate 22, as best illustrated in FIG. 5. In the exemplary form of the invention shown in FIGS. 2 and 3, the first and second mating complementary cover elements 20, 21 are each provided with first and second mating longitudinal edges 30, 31, respectively, and mating transverse edges 32 on the end wall portions 34 of the cover elements 20, 21. As here shown, the cover elements 20, 21 each include a semi-cylindrical wall portion 35 adjacent the semi-cylindrical base portion 25, and a semi-frustoconical portion 36 intermediate the semi-cylindrical portion 35 and the transverse end wall 34, the latter being located at the apicad end of the semi-frustoconical portion 36.

In carrying out the present invention, the mating first longitudinal edges 30 of cover elements 20, 21 are preferably hingedly connected together throughout the entire length of the semi-cylindrical portions 35 by any suitable hinge means, generally indicated at 38 in FIG. 3. In keeping with the dust-tight aspects of the invention, the hinge means 38 may simply take the form of a piece of flexible, imperforate material—e.g., a sheet of natural or synthetic rubber material or the like—permanently affixed to the outer surfaces of the semi-cylindrical portions 35 of cover elements 20, 21 along the first mating longitudinal edges 30. The balance of the first longitudinal edge 30, the second longitudinal edge 31 and the end wall edge 32 on cover element 20 are provided with integral, off-set depending shoulders 39 which overlap the marginal edges 30, 31 and 32 of cover element 21 when the cover elements 20, 21 are in the closed position shown in FIG. 2, thereby effectively precluding ingress of airborne contaminants through the abutting edges of the cover elements.

Figure 4:
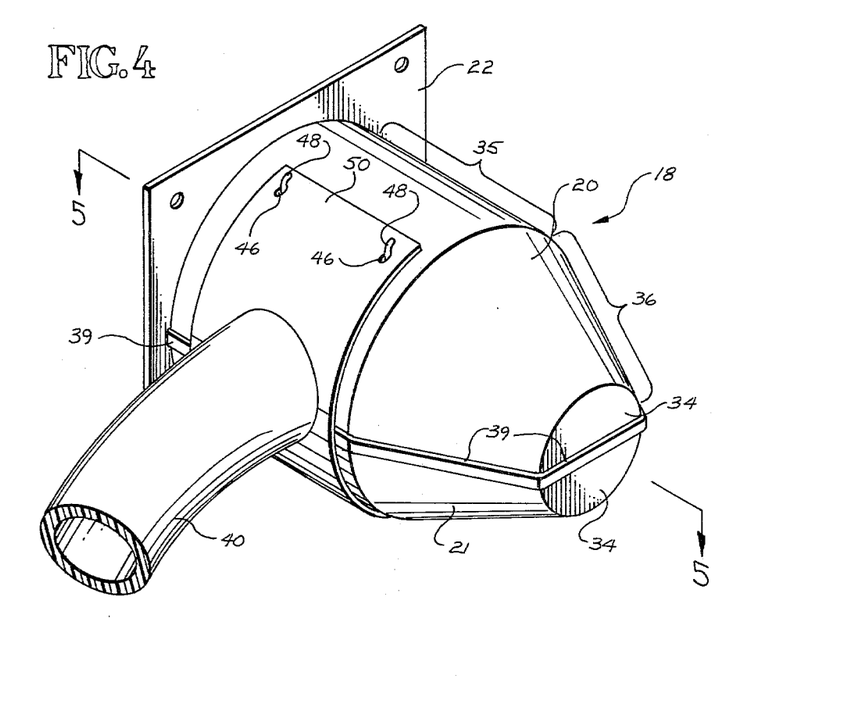
FIG. 4 is a perspective view similar to the view shown in FIG. 1, but here illustrating the protective cover device with an on-loading/off-loading liquid conduit or hose coupled to the internally located inlet/outlet valve in the manner normally employed during a liquid on-loading and/or off-loading operation.

In order to permit coupling of the inlet/outlet valve 24 to a suitable on-loading/off-loading hose or liquid conduit 40 (FIGS. 4 and 5), a pair of mating edges of the first and second mating complementary cover elements 20, 21 are provided with aperture defining means dimensioned to permit the liquid conduit 40 to project through the enclosed wall of the protective cover device 18. In the embodiment of the invention shown by way of example in FIGS. 2 and 3, the aperture defining means take the form of mating semi-circular, cut-away portions 41 formed in the mating second longitudinal edges 31 of the first and second cover elements 20, 21; with such cut-away portions 41 here being located in the mating edges 31 generally centrally of the semi-cylindrical portions 35. Thus, when the protective cover device 18 is closed as shown in FIG. 2, the semicircular mating cut-away portions 41 define a circular opening 42 in the side wall of the protective cover device 18 with such opening 42 being aligned coaxially with the laterally extending inlet/outlet port 44 (FIG. 3) associated with inlet/outlet valve 24.

In accordance with another of the important aspects of the present invention, provision is made for effectively closing the opening 42 during periods when the inlet/outlet valve 24 is closed and, at the same time, for securely retaining the protective cover device 18 on the mounting flange 29 secured to tank 16. To this end, in the form of the invention shown in FIGS. 2 and 3, a first imperforate cover means, generally indicated at 45, is preferably secured to both the first and second mating complementary cover elements 20, 21. As here depicted, cover means 45 comprises a sheet of imperforate flexible material—e.g., a sheet of natural or synthetic rubber or the like—which can be applied about the outer surfaces of the semi-cylindrical portions 35 of cover elements 20, 21 in overlying relation to the opening 42 and which is retained snugly in place in dust-tight relation thereto by means of eyes 46 formed in the flexible sheet 45 and positioned to be engaged with mating hooks secured to the cover elements 20, 21—one pair of such hooks 48 secured to cover element 20 being visible in FIG. 2—or by other suitable means.

The arrangement is such that in use, the tank truck operator simply positions the hinged complementary mating cover elements 20, 21 about the mounting flange 29, pivots the two cover elements to the closed position shown in FIG. 2, and engages the flexible cover sheet 45 with the hooks 48 on the two cover elements, thereby effectively securing the protective cover device 18 to the tank 16 and, at the same time, effectively closing the opening 42 so as to preclude ingress of contaminants into the interior of the cover device 18. When the tank truck operator is ready to couple a liquid conduit 40 to the inlet/outlet valve 24 for the purpose of on-loading and/or off-loading the tank 16, it is merely necessary to unhook the flexible sheet 45, pivot the cover element 20 about hinge 38 from the closed position shown in FIG. 2 to the open position shown in FIG. 3, thereby exposing the valve 24, its laterally extending inlet/outlet port 44, and the valve operating handle 49.

To preclude separation of the protective cover device 18 from the tank 16, the radially inwardly extending retaining flange 26 on cover element 21 may, if desired, be permanently or removably affixed to the mounting flange 29 in any suitable fashion (not shown) such, for example, as by welding, adhesive bonding, or separable fastening elements such as rivets or threaded fasteners. It is, however, preferred that the cover elements 20, 21 be separably connected to the tank 16 to facilitate removal and cleaning thereof on a daily basis—a particularly important consideration when transporting comestible products where it is important to maintain the equipment in as sanitary condition as possible at all times. Indeed, while the protective cover devices of the present invention can be formed of a wide range of materials, it has been found that maintenance of sanitary conditions can be facilitated where the cover elements 20, 21 are molded from suitable impact-resistant thermoplastic materials (which may have insulating properties), thereby forming cover elements which are essentially devoid of crevices that tend to accumulate contaminants.

To insure that no airborn contaminants are permitted to enter the interior of the protective cover device 18 during on-loading and off-loading operations while liquid conduit 40 is coupled to the inlet/outlet port 44 of valve 24, the liquid conduit 40 is preferably provided with a second integral cover means 50 (FIGS. 4 and 5) which may again take the form of a sheet of imperforate flexible material such as natural or synthetic rubber or the like. Thus, when the tank truck operator has opened the dust cover as shown in FIG. 3, coupled conduit 40 to the inlet/outlet port 44 of valve 24 as shown in FIG. 5, and opened the valve 24, it is merely necessary to again close the protective cover device 18 by pivoting cover element 20 about the hinged connection 38 from the position shown in FIG. 3 to that shown in FIG. 4 and, when closed, the operator simply engages the hooks 48 with the eyes 46 formed in the second flexible sheet-like cover means 50. Those skilled in the art will appreciate that conduit 40 and its integral associated second cover means 50 may simply comprise the on-loading/off-loading hose commonly connected to a pump (not shown) which can either be carried by the tank trailer 15 or its truck cab, or can be permanently located at the facilities of the individual dairy farms and the milk processing center.

Figure 6:
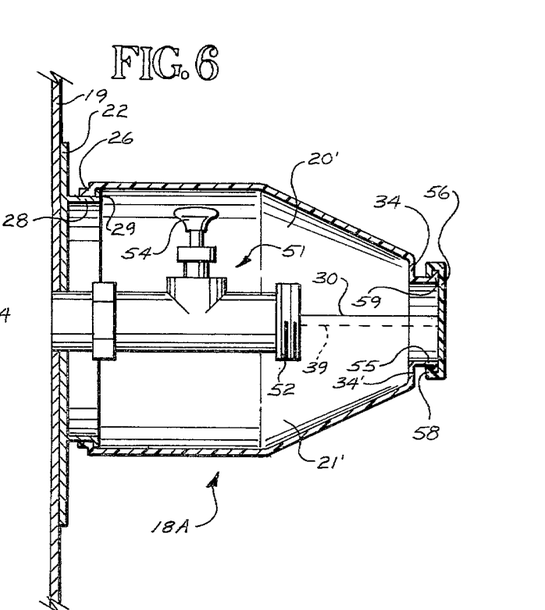
FIG. 6 is a partial plan and partial sectional view similar to FIG. 5 but taken at right angles thereto, here illustrating a modified form of the invention suitable for use with tank valves of the type having an in-line inlet/exit port rather than a laterally projecting inlet/exit port as shown in FIG. 5.

The present invention finds equally advantageous use in connection with liquid storage tanks of the type having valve members with in-line inlet/outlet ports. As best shown in the modified form of the invention depicted in FIG. 6, a valve member 51 having an in-line inlet/outlet port 52 and a laterally extending valve operating handle 54, is mounted in the tank wall 19 and extends coaxially through mounting plate 22. In this embodiment of the invention, the aperture defining means for the protective cover device 18A are formed in the mating end walls 34' of the first and second mating complementary cover elements 20', 21', with the aperture defining means forming an axially projecting stub conduit 55. Thus, when the valve 51 is not connected to an on-loading/off-loading liquid conduit, it is merely necessary to secure a suitable cap 56 on the projecting end of the stub conduit 55 in any suitable fashion—for example, the cap 56 may simply be a "snap-on" type cap having a flexible, inwardly extending circular retaining lip 58 adapted to be snapped over a radially outwardly extending retaining flange 59 formed on the outer extremity of projecting stub conduit 55. In such an arrangement, the "snap-on" cap 56 serves the dual function of holding the mating complementary cover elements 20', 21' together in close, snug conforming relationship about mounting flange 29 and, at the same time, effectively closes the aperture defined by the stub conduit 55, thereby precluding entry of contaminants into the interior portion of the protective cover device 18A when the valve 51 is closed.

To permit an on-loading or off-loading operation, "snap-on" cap 56 is removed from the stub conduit 55, and one of the cover elements 20', 21' is pivoted about its hinged connection to expose the valve 51 and its operating handle 54. A hose or other liquid conduit (not shown in FIG. 6, but similar to the conduit 40 shown in FIGS. 4 and 5) is passed through the aperture defined by stub conduit 55 and coupled to the in-line inlet/outlet port 52 on valve 51. The pivoted one of of the cover elements 20', 21' is then again pivoted about its hinged connection to reclose the protective cover device 18A. Preferably the on-loading/off-loading conduit includes an integral "snap-on" cap similar to the cap 56, thereby permitting a contaminant free, dust-tight connection for the protective cover device 18A even during on-loading and/or off-loading operations. Although such an integral "snap-on" cap/conduit combination has not been illustrated in FIG. 6, it would preferably take the form of the cap 56' and conduit 40 hereinafter illustrated and described in connection with the embodiment of the invention shown in FIGS. 7 and 10.

Figure 7:
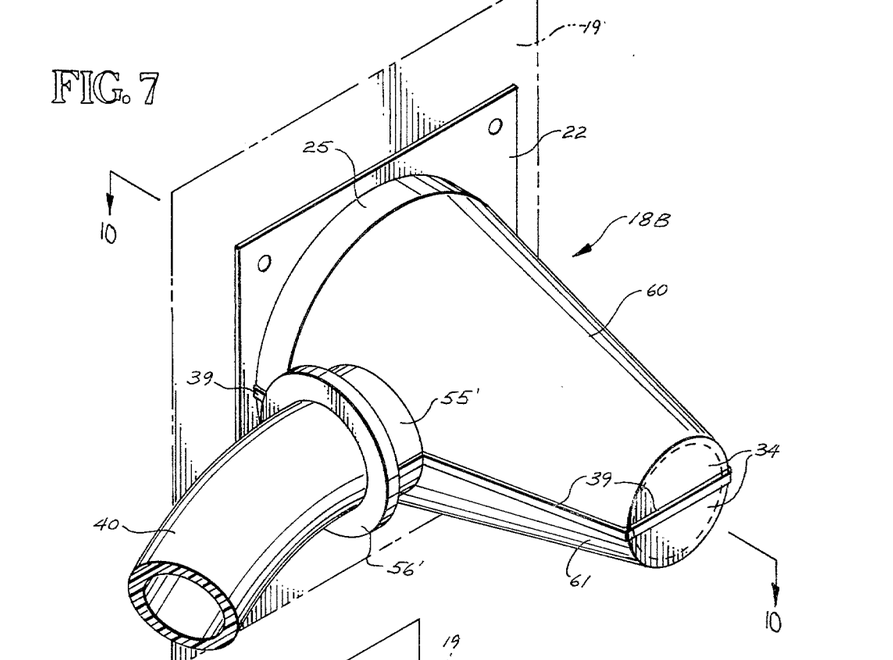
FIG. 7 is a perspective view similar to the view shown in FIG. 4, but here illustrating a slightly modified type of protective cover device also embodying features of the present invention with the device here being shown coupled to an on-loading/off-loading liquid conduit.
Figure 8:
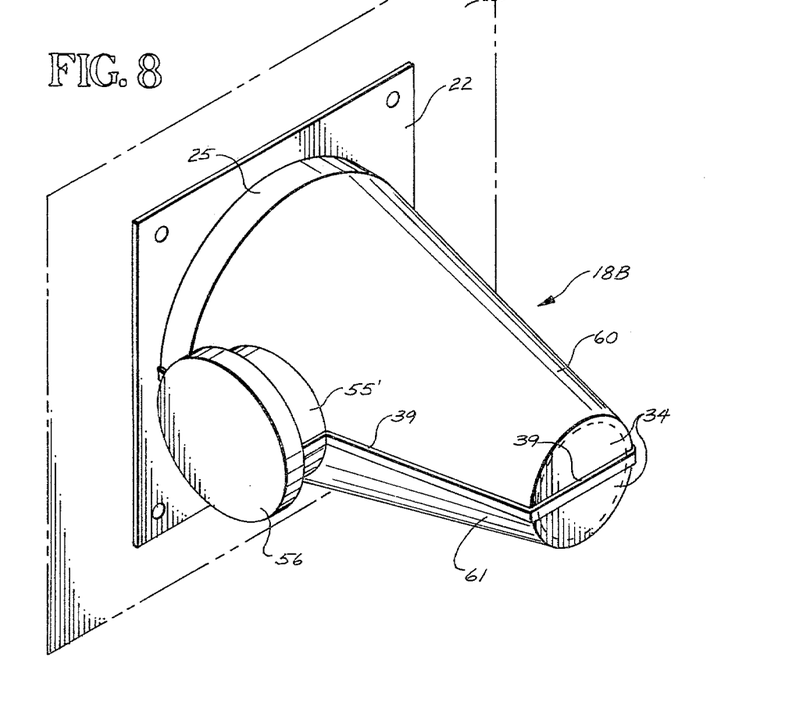
FIG. 8 is a perspective view of the protective cover device shown in FIG. 7, here illustrating the device in the closed condition normally encountered when the interior inlet/outlet valve is closed.
Figure 9:
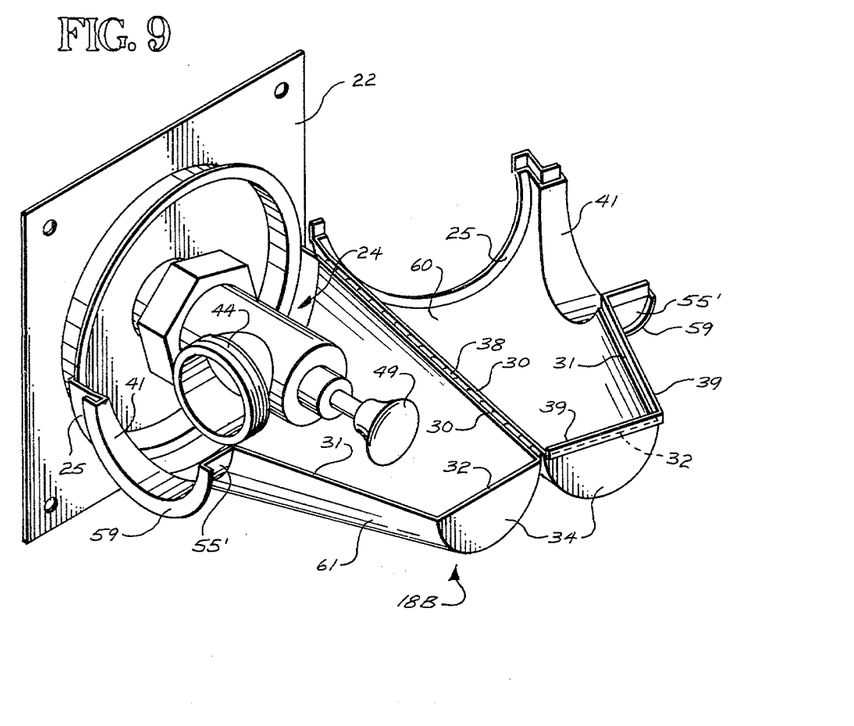
FIG. 9 is a perspective view of the protective cover device shown in FIG. 7, here illustrating the device in the open condition with the interior inlet/outlet valve completely exposed and accessible; and, FIG. 10 is a view partially in plan and partially in section taken substantially along the line 10—10 in FIG. 7.
Figure 10:
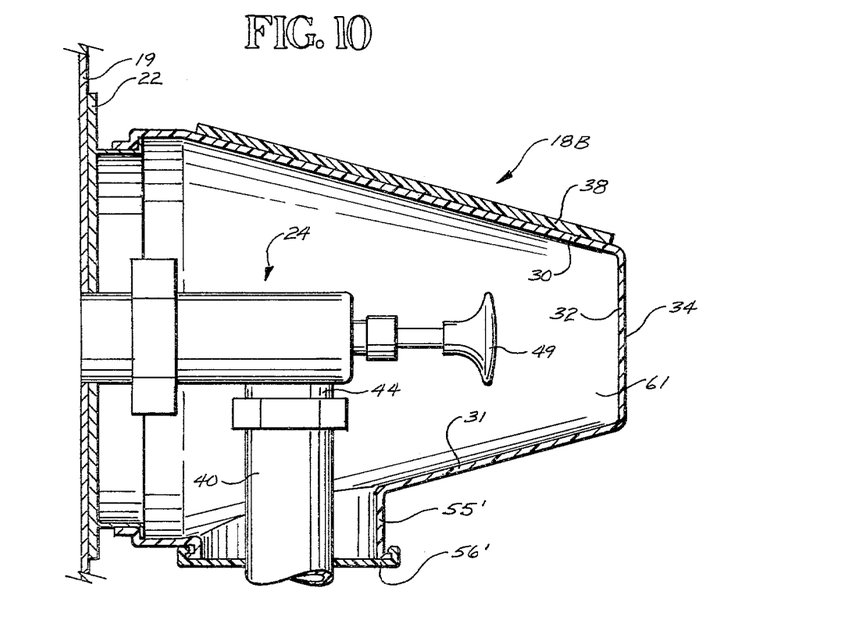

Referring next to FIGS. 7-10, there has been illustrated yet another slightly modified protective cover device 18B embodying features of the present invention. In this form of the invention, first and second mating complementary cover elements 60, 61 are provided which are substantially identical to the cover elements 20, 21 shown in FIGS. 1-5; except, that in this case the cover elements 60, 61 are semi-frustoconical n shape throughout substantially the entire length of the cover elements extending from the semi-cylindrical base portions 25 to the end walls 34 located at the apicad end of the device 18B. That is, the modified protective cover device 18B shown in FIGS. 7-10 does not include semi-cylindrical portions similar to the semi-cylindrical portions 35 shown in the embodiment of FIGS. 1-5. Consequently, the aperture defining means 41 (FIG. 9) formed in the second mating longitudinal edges 31 are formed in the frustoconical region of the protective cover device 18B. As here shown, the aperture defining means 41 are shaped and positioned to form a laterally extending stub conduit 55' which, when the cover device 18B is closed as shown in FIGS. 7, 8 and 10, is coaxial with the laterally extending inlet/outlet port 44 on valve 24. Stub conduit 55' is provided with a radially outwardly extending retaining flange 59 adapted to be interengaged with a radially inwardly extending retaining lip 58 formed on a first cover means which here takes the form of a "snap-on" cap 56, thereby effectively closing the aperture defined by the stub conduit 55' when the protective cover device 18B is in the closed position shown in FIG. 8 and the valve 24 is closed.

When the tank truck operator desires to convert to a liquid on-loading or off-loading mode of operation, it is simply necessary to remove the "snap-on" cap 56 and pivot the cover element 60 about hinged connection 38 along the first mating longitudinal edges 30 of the cover elements 60, 61 to the open position as shown in FIG. 9. The liquid hose or conduit 40 is then coupled to inlet/outlet port 44 on valve member 24 as best shown in FIG. 10 and in precisely the same manner as previously described in connection with the embodiment of the invention shown by way of example in FIG. 5. The tank truck operator then operates valve member 24 by actuation of the operating handle 49 and recloses the protective cover device 18B by pivoting cover element 60 about hinge 38 from the position shown in FIG. 9 to the position shown in FIG. 7, at which point the mating edges 30, 31 and 32 of the cover elements 60, 61 are engaged in face-to-face abutting relation and shoulders 39 on cover element 60 overlap the marginal edge portions of cover element 61, thereby providing a snug, dust-tight enclosure. As in the embodiment of the invention heretofore described in connection with FIG. 6, conduit 40 is preferably provided with a second cover means which here takes the form of an integral "snap-on" cap 56' which can be interengaged with stub conduit 55' in the same manner as the first "snap-on" cover means or cap 56.

Thus, this form of the invention readily permits the tank truck operator to quickly open up an enclosed, dust-tight protective cover device, couple and/or uncouple a liquid conduit to or from an inlet/outlet valve, open and/or close the valve, and reclose the protective cover device 18B; yet, wherein the dust-tight nature of the device can be maintained in both the valve closed position (FIG. 8) and in the valve open on-loading and/or off-loading position (FIGS. 7 and 10).

Of course, those skilled in the art will appreciate that various modifications can be made to the exemplary forms of the invention herein illustrated and described without departing from the spirit and scope of the invention as expressed in the appended claims. For example, the projecting stub conduit configuration shown in FIGS. 7 through 10 could be incorporated in the form of the invention illustrated in FIGS. 1-5; the flush sealing arrangement illustrated in FIGS. 1-5 where a flexible sheet of material is wrapped about the outer surfaces of the mating cover elements in the plane of the cover elements could be utilized in the form of the invention shown in FIGS. 7-10 in lieu of a projecting stub conduit arrangement; and, the in-line aperture defining means shown in FIG. 6 could be readily used with a protective cover device of the type shown in FIGS. 7-10 provided only that the inlet/outlet valve was an in-line valve of the type shown at 51 in FIG. 6. In all cases, the principle aspects of the invention permit of complete exposure of the inlet/outlet valve within the protective cover device for purposes of (i) attaching and/or removing a liquid conduit and (ii) actuation of the valve operating handle; yet, provide an effective, relatively dust-tight, contaminant-free protective covering in both a valve "closed" and a valve "open" mode of operation. In each instance, the tank truck operator can readily connect or disconnect the liquid conduit/valve combination and turn the inlet/outlet valve to an open or closed position with ease and without undue lost time or motion. Moreover, protective cover devices made in accordance with the present invention are highly advantageous because they readily permit of routine removal and ease of cleaning, even on a daily basis at the end or start of a work day, thereby insuring maintainance of highly sanitary conditions at all times.

What is claimed is:

1. A protective cover device for use in maintaining the inlet and/or outlet valve means of a liquid storage tank in a contaminant-free state wherein the liquid storage tank has (a) valve means mounted therein and projecting outwardly therefrom and (b) a mounting flange defining an outwardly extending retaining lip mounted on the storage tank in surrounding relationship to the valve means, said protective cover device comprising, in combination: first and second mating complementary cover elements; and first and second mating complementary cover elements each having (i) first and second mating longitudinal edges, (ii) mating tranverse edges, and (iii), a base portion defining an inwardly extending retaining flange for fitting over the outwardly extending lip and removably securing said first and second mating complementary cover elements to the storage tank in surrounding relationship to the valve means thereon; means for hingedly securing said first mating longitudinal edges of said first and second mating complementary cover elements together; aperture defining means formed in one mating pair of said second mating edges and said mating transverse edges of said first and second mating complementary cover elements; first and second cover means for covering the aperture defined by said aperture defining means, said first cover means being imperforate for preventing ingress of contaminants into the interior of the protective cover device when the storage tank valve means are closed and said second cover means having a liquid conduit projecting therethrough and means for coupling said conduit to the valve means on the storage tank for preventing ingress of contaminants into the interior of the protective cover device when the storage tank valve means are open while at the same time permitting freedom of liquid movement through said conduit and the open valve means; and, means for removably securing one of said first and second cover means to said first and second mating complementary cover elements in overlying relation to said aperture defining means formed in said one mating pair of said second mating edges and said mating transverse edges of said first and second cover elements.

2. A protective cover device as set forth in claim 1 further characterized in that the liquid storage tank is a mobile tank for storing milk and wherein said first and second mating complementary cover elements define a substantially dust-tight enclosure for the inlet and/or outlet valve means on the tank when (i) said second mating longitudinal edges and said mating transverse edges are in abutting relationship, (ii) said base portions are engaged with the retaining lip on the mounting flange, and (iii) one of said first and second cover means is removably secured to said first and second mating complementary cover elements in overlying relationship to said aperture defining means.

3. A protective cover device as set forth in claim 1 further characterized in that said aperture defining means are formed in said second mating longitudinal edges of said first and second mating complimentary cover elements.

4. A protective cover device as set forth in claim 3 further characterized in that said aperture defining means defines an opening lying in the plane of said first and second mating complementary cover elements and said first and second cover means include a sheet of imperforate flexible material adapted to snugly conform to the outer surface of the protective cover device defined by said cover elements so as to preclude entry of contaminants into the interior of said device.

5. A protective cover device as set forth in claim 3 further characterized in that said aperture defining means defines a laterally projecting stub conduit, said first and second cover means include a cap portion for closing the outboard end of said stub conduit, and means are provided for securing said cap portion to the outboard end of said stub conduit.

6. A protective cover device as set forth in claim 1 further characterized in that said aperture defining means are formed in the abutting end walls of said first and second mating complimentary cover elements.

7. A protective cover device as set forth in claim 1 further characterized in that said first and second mating complementary cover elements each include a semi-cylindrical portion and said aperture defining means are formed in said second mating longitudinal edges of the semi-cylindrical portions of said first and second mating complementary cover elements.

8. A protective cover device for use in maintaining the inlet and/or outlet valve means of a liquid storage tank in a contaminant-free state wherein the liquid storage tank has (a) valve means mounted therein and projecting outwardly therefrom and (b) a mounting flange defining an outwardly extending retaining lip mounted on the storage tank in surrounding relationship to the valve means, said protective cover device comprising, in combination: first and second mating complementary cover elements; said first and second mating complementary cover elements each including a semi-frustoconical portion and an end wall at the apicad end of said semi-frustoconical portion; said first and second mating complementary cover elements each having (i) first and second mating longitudinal edges, (ii) mating transverse edges formed on said end walls, and (iii), a base portion defining an inwardly extending retaining flange for fitting over the outwardly extending lip and removably securing said first and second mating complementary cover elements to the storage tank in surrounding relationship to the valve means thereon; means for hingedly securing said first mating longitudinal edges of said first and second mating complementary cover elements together; aperture defining means formed in one mating pair of said second mating edges and said mating transverse edges of said first and second mating complementary cover elements; first and second cover means for covering the aperture defined by said aperture defining means, said first cover means being imperforate for preventing ingress of contaminants into the interior of the protective cover device when the storage tank valve means are closed and said second cover means having a liquid conduit projecting therethrough and means for coupling said conduit to the valve means on the storage tank for preventing ingress of contaminants into the interior of the protective cover device when the storage tank valve means are open while at the same time permitting freedom of liquid movement through said conduit and the open valve means; and, means for removably securing one of said first and second cover means to said first and second mating complementary cover elements in overlying relation to said aperture defining means formed in said one mating pair of said second mating edges and said mating transverse edges of said first and second cover elements.

9. A protective cover device as set forth in claim 8 further characterized in that said aperture defining means defines a stub conduit projecting laterally from said semi-frustoconical portions when said portions are in abutting mated relationship, said first and second cover means include a cap portion for closing the outboard end of said stub conduit, and means are provided for securing said cap portion to the outboard end of said stub conduit.

10. A protective cover device as set forth in claim 8 further characterized in that said aperture defining means are formed in the mating end walls at the apicad end of said semi-frustoconical portions.

11. A protective cover device for use in maintaining the inlet and/or outlet valve means of a liquid storage tank in a contaminant-free state comprising, in combination: means defining a mounting flange having an outwardly extending retaining lip formed thereon; means for securing said mounting flange to a liquid storage tank in surrounding relationship to valve means mounted in the storage tank wall and projecting outwardly therefrom; first and second mating complementary cover elements; said first and second mating complementary cover elements each having (i) firt and second mating longitudial edges, (ii) mating transverse edges, and (iii), a base portion defining an inwardly extending retaining flange for fitting over said outwardly extending retaining lip and removably securing said first and second mating complementary cover elements to the storage tank in surrounding relationship to the valve means thereon; means for hingedly securing said first mating longitudinal edges of said first and second mating complementary cover elements together; aperture defining means formed in one mating pair of said second mating edges and said mating transverse edges of said first and second mating complementary cover elements; first and second cover means for covering the aperture defined by said aperture defining means, said first cover means being imperforate for preventing ingress of contaminants into the interior of the protective cover device when the storage tank valve means are closed and said second cover means having a liquid conduit projecting therethrough and means for coupling said conduit to the valve means on the storage tank for preventing ingress of contaminants into the interior of the protective cover device when the storage tank valve means are open while at the same time permitting freedom of liquid movement through said conduit and the open valve means; and, means for removably securing one of said first and second cover means to said first and second mating complementary cover elements in overlying relation to said aperture defining means formed in said one mating pair of said second mating edges and said mating transverse edges of said first and second cover elements.

12. A protective cover device as set forth in claim 11 further characterized in that the liquid storage tank is a mobile tank for storing milk and wherein said first and second mating complementary cover elements define a substantially dust-tight enclosure for the inlet and/or outlet valve means on the tank when (i) said second mating longitudinal edges and said mating transverse edges are in abutting relationship, (ii) said base portions are engaged with the retaining lip on the mounting flange, and (iii) one of said first and second cover means is removably secured to said first and second mating complementary cover elements in overlying relationship to said aperture defining means.

13. A protective cover device as set forth in claim 11 further characterized in that said aperture defining means are formed in said second mating longitudinal edges of said first and second mating complimentary cover elements.

14. A protective cover device as set forth in claim 13 further characterized in that said aperture defining means defines an opening lying in the plane of said first and second mating complementary cover elements and said first and second cover means include a sheet of imperforate flexible material adapted to snugly conform to the outer surface of the protective cover device defined by said cover elements so as to preclude entry of contaminants into the interior of said device.

15. A protective cover device as set forth in claim 13 further characterized in that said aperture defining means defines a laterally projecting stub conduit, said first and second cover means include a cap portion for closing the outboard end of said stub conduit, and means are provided for securing said cap portion to the outboard end of said stub conduit.

16. A protective cover device as set forth in claim 11 further characterized in that said aperture defining means are formed in the abutting end walls of said first and second mating complimentary cover elements.

17. A protective cover device as set forth in claim 11 further characterized in that said first and second mating complementary cover elements each include a semi-cylindrical portion and said aperture defining means are formed in said second mating longitudinal edges of the semi-cylindrical portions of said first and second mating complementary cover elements.

18. A protective cover device for use in maintaining the inlet and/or outlet valve means of a liquid storage tank in a contaminant-free state comprising, in combination: means defining a mounting flange having an outwardly extending retaining lip formed thereon; means for securing said mounting flange to a liquid storage tank in surrounding relationship to valve means mounted in the storage tank wall and projecting outwardly therefrom; first and second mating complementary cover elements; said first and second mating complementary cover elements each including a semi-frustoconical portion and an end wall at the apicad end of said semi-frustoconical portion; said first and second mating complementary cover elements each having (i) first and second mating longitudinal edges, (ii) mating transverse edges formed on said end walls, and (iii), a base portion defining an inwardly extending retaining flange for fitting over said outwardly extending retaining lip and removably securing said first and second mating complementary cover elements to the storage tank in surrounding relationship to the valve means thereon; means for hingedly securing said first mating longitudinal edges of said first and second mating complementary cover elements together; aperture defining means formed in one mating pair of said second mating edges and said mating transverse edges of said first and second mating cover elements; first and second cover means for covering the aperture defined by said aperture defining means, said first cover means being imperforate for preventing ingress of contaminants into the interior of the protective cover device when the storage tank valve means are closed and said second cover means having a liquid conduit projecting therethrough and means for coupling said conduit to the valve means on the storage tank for preventing ingress of contaminants into the interior of the protective cover device when the storage tank valve means are open while at the same time permitting freedom of liquid movement through said conduit and the open valve means; and, means for removably securing one of said first and second cover means to said first and second mating complementary cover elements in overlying relation to said aperture defining means formed in said one mating pair of said second mating edges and said mating transverse edges of said first and second cover elements.

19. A protective cover device as set forth in claim 18 further characterized in that said aperture defining means defines a stub conduit projecting laterally from said semi-frustoconical portions when said portions are in abutting mated relationship, said first and second cover means include a cap portion for closing the outboard end of said stub conduit, and means are provided for securing said cap portion to the outboard end of said stub conduit.

20. A protective cover device as set forth in claim 18 further characterized in that said aperture defining means are formed in the mating end walls at the apicad end of said semi-frustoconical portions.

* * * * *